US007908723B1

(12) United States Patent
Kodi

(10) Patent No.: US 7,908,723 B1
(45) Date of Patent: Mar. 22, 2011

(54) BAR CLIP APPLICATOR

(75) Inventor: Jon R. Kodi, Lebanon, TN (US)

(73) Assignee: Kodi Klip Corporation, Lebanon, TN (US)

(*) Notice: Subject to any disclaimer, the term of this patent is extended or adjusted under 35 U.S.C. 154(b) by 1140 days.

(21) Appl. No.: 11/142,539

(22) Filed: Jun. 1, 2005

(51) Int. Cl.
*B23P 11/00* (2006.01)

(52) U.S. Cl. .................................. 29/243.56; 29/243.53

(58) Field of Classification Search ............... 29/243.56, 29/243.55, 243.53, 243.57
See application file for complete search history.

(56) References Cited

U.S. PATENT DOCUMENTS

| | | | |
|---|---|---|---|
| 1,852,673 | A | 4/1932 | Pilj |
| 1,986,528 | A | 1/1935 | Ranger |
| 2,551,826 | A | 5/1951 | Cox, Sr. |
| 2,571,337 | A | 10/1951 | Burnham |
| 2,879,087 | A | 3/1959 | Haglund |
| 3,006,115 | A | 10/1961 | Hillberg |
| 3,216,752 | A | 11/1965 | Rifken |
| 3,360,883 | A | 1/1968 | Glanzer |
| 3,788,025 | A | 1/1974 | Holmes |
| 4,060,954 | A | 12/1977 | Liuzza |
| 4,080,770 | A | 3/1978 | Vigh |
| 4,110,951 | A | 9/1978 | Padrun |
| 4,136,984 | A | 1/1979 | Hayashi |
| 4,136,985 | A | 1/1979 | Taul |
| 4,214,841 | A | 7/1980 | Hayashi |
| 4,440,519 | A | 4/1984 | Pennel et al. |
| 4,482,088 | A | 11/1984 | Hyun |
| 4,511,073 | A | 4/1985 | Furutsu |
| 4,610,122 | A | 9/1986 | De Clercq |
| 4,617,775 | A | 10/1986 | Padrun |
| 4,800,702 | A | 1/1989 | Wheeler |
| 4,835,933 | A | 6/1989 | Yung |
| 4,991,372 | A | 2/1991 | Sonneville |
| 5,370,293 | A | 12/1994 | Bevins |
| 5,371,991 | A | 12/1994 | Bechtel et al. |
| D355,582 | S | 2/1995 | Sleight |
| 5,518,399 | A | 5/1996 | Sicurelli, Jr. et al. |
| 5,588,554 | A | 12/1996 | Jones |
| 5,595,039 | A | 1/1997 | Lowery |
| 5,626,436 | A | 5/1997 | Dragone |
| 5,683,025 | A | 11/1997 | Grendol |
| 5,697,591 | A | 12/1997 | Cooper |
| 5,752,297 | A | 5/1998 | Ramey |
| 5,826,629 | A | 10/1998 | West |
| 5,881,452 | A * | 3/1999 | Nowell et al. .................. 29/816 |
| 5,893,252 | A | 4/1999 | Hardy et al. |
| 6,148,488 | A | 11/2000 | Gristock |
| 6,276,108 | B1 | 8/2001 | Padrun |
| 6,354,054 | B1 | 3/2002 | Verelli et al. |

(Continued)

FOREIGN PATENT DOCUMENTS

| | | |
|---|---|---|
| JP | 04108944 | 4/1992 |

*Primary Examiner* — Lee D Wilson
(74) *Attorney, Agent, or Firm* — Waddey & Patterson, P.C.; Lucian Wayne Beavers

(57) ABSTRACT

A reinforcement bar clip applicator includes an applicator body having a handle and a receiver tip. The receiver tip is adapted to receive reinforcement bar clips made of two opposing clasp assemblies. With the second clasp assembly of the bar clip removably affixed to the receiver tip, the assembly forms a bar clip application system adapted to allow the user to remotely attach the first clasp assembly of the bar clip to a reinforcement bar.

6 Claims, 6 Drawing Sheets

U.S. PATENT DOCUMENTS

| | | | | |
|---|---|---|---|---|
| 6,371,763 | B1 | 4/2002 | Sicurelli, Jr. et al. | |
| 6,513,555 | B1 * | 2/2003 | Lesser et al. | 140/123.6 |
| 6,585,142 | B1 | 7/2003 | Chen | |
| 6,672,498 | B2 | 1/2004 | White et al. | |
| 6,725,535 | B2 | 4/2004 | Edson et al. | |
| 6,802,848 | B2 * | 10/2004 | Anderson et al. | 606/157 |
| 6,857,246 | B2 | 2/2005 | Erbetta et al. | |
| 6,915,624 | B2 | 7/2005 | Shibazaki et al. | |
| 6,925,698 | B2 | 8/2005 | Goodsmith et al. | |
| 6,971,515 | B2 | 12/2005 | Cooper et al. | |
| 7,003,860 | B2 | 2/2006 | Bloch et al. | |
| D529,794 | S | 10/2006 | Murray | |
| 7,147,209 | B2 | 12/2006 | Jones et al. | |
| D534,418 | S | 1/2007 | Minor et al. | |
| 2003/0154579 | A1 | 8/2003 | Disher | |
| 2003/0176879 | A1 * | 9/2003 | Anderson et al. | 606/158 |
| 2004/0040247 | A1 | 3/2004 | Morse | |
| 2004/0154261 | A1 | 8/2004 | Miller | |
| 2004/0261352 | A1 | 12/2004 | Bennett et al. | |
| 2005/0217198 | A1 | 10/2005 | Carraher et al. | |

* cited by examiner

BAR CLIP APPLICATOR

The present invention relates generally to a system and method of attaching and aligning reinforcing bars in a framework for supporting a concrete matrix. More particularly, this invention pertains to an apparatus and method of attaching bar clips to reinforcing bars so as to join the bars in a framework. Even more particularly, this invention pertains to a clip applicator system for applying bar clips for joining pairs of reinforcing bars in a parallel orientation.

It has been long known in the art of reinforced concrete structures to provide fastening means for aligning and attaching reinforcing bars in a framework prior to encasing such bars in a concrete matrix. One well known fastening means used in forming a framework of reinforcing bars is to wrap adjacent bars with wire ties, or other similar binding materials. Another well known fastening means is to attach such reinforcing bars by welding instead of wrapping. Both of these fastening means provide for attaching bars arranged in either transverse or parallel orientations. However, both means are labor intensive and, thus, more expensive when compared to the use of more recently developed reinforcing bar clips.

Plastic clips have been developed to provide a means of rapidly attaching adjacent reinforcing bars that are arranged in transverse orientations. For example, Padrum, in U.S. Pat. No. 4,110,951, teaches a plastic U-shaped clip formed by two opposing flanges extending from a base. Each of the flanges is split to form opposing and aligned openings within each flange. The clip is positioned and aligned above two reinforcement bars that are in a transverse orientation to each other. Pressure is applied by the user to the base of the clip. This pressure causes the first reinforcing bar to be forced between the flanges and held in an upper position. Continued application of pressure upon the base causes the second reinforcing bar to be forced between the opposing split openings in the flanges and held in a lower position independent of the first bar. Padrum does not teach an apparatus or method of applying the clip to the reinforcing bars and it is expected that the clips are applied by hand operations with the user in close proximity to the reinforcing bars.

A second example of prior art plastic clips is shown in U.S. Pat. No. 5,626,436 to Dragone. The Dragone clip is a U-shaped assembly comprising two parallel longitudinal members connecting two opposed hook assemblies. Each hook assembly comprises two connecting members, each extending from one of the longitudinal members, and a fulcrum section. A hook is formed by two opposing fingers, each attached at an opposite end of the fulcrum section and extending from the fulcrum section in a direction away from the longitudinal members. A gap is formed between each pair of opposing fingers. To install the Dragone clip, a first reinforcing bar is forced between the two opposed hook assemblies and held in an upper position against the parallel longitudinal members. The parallel longitudinal members are squeezed together by the user, causing each pair of opposing fingers to spread apart. The user slips the spread fingers of the opposing hooks over a second reinforcing bar that is positioned transverse to the first bar. The user then releases the parallel longitudinal members. As the parallel longitudinal members separate, each pair of opposing fingers close around the second bar and hold it in a lower position. The Dragone clip is sized so as to hold the second bar against the first bar. Dragone does not teach an apparatus or method of applying the clip to the reinforcing bars and it is expected that the clips are also applied by hand operations with the user in close proximity to the reinforcing bars.

One shortcoming of these two current art plastic clips is the necessity of hand manipulation of a clip and a bar during the application of a clip to a bar by the user. This disadvantage of the current art can contribute to prolonged construction times, higher labor costs and user fatigue. Another shortcoming is the necessity of the user being in very close physical proximity to the application site on a bar in order to apply a clip. This is a disadvantage in complex frameworks where there is typically little room for a user to maneuver himself within the framework of reinforcement bars to reach the application site. This second disadvantage of the current art can also contribute to prolonged construction times, higher labor costs and user fatigue.

What is needed, then, is a bar clip applicator system that applies a reinforcement bar clip onto a reinforcing bar without the need of manipulating the clip onto the bar by hand. To make the task of attaching reinforcement bars in a framework as quick and easy as possible, it would be advantageous if the bar clip applicator system also provided for application of a bar clip to a reinforcement bar from a stand-off distance. It would also be advantageous if the bar clip applicator system provided for easily recognizable coding means for matching the size of the bar clip, the bar clip applicator and the reinforcement bars.

BRIEF SUMMARY OF THE INVENTION

The present invention is directed toward a bar clip applicator including an applicator body having detachable a handle and a detachable receiver tip, the receiver tip having a selected tip width and a width marking. The selected receiver tip is adapted to receive color-coded molded plastic reinforcement bar clips made of two opposing clasp assemblies of a size corresponding to the receiver tip width marking. With the second clasp assembly of the bar clip removably affixed to the receiver tip, the assembly forms a bar clip system adapted to allow the user to remotely attach the first clasp assembly of the bar clip to a reinforcement bar. In preferred embodiments, the applicator body further includes a capture means by which the user can capture a second reinforcement bar and insert it into the second clasp assembly so as to attach the first and second reinforcement bars together by means of the bar clip.

In a preferred embodiment, the applicator body includes a receiver channel adapted to retain a receiver tip sized in its tip width to be inserted in the upper clasp of a bar clip and to hold the bar clip in place by friction fit. The detachable handle is selected for such length that allows the user to efficiently position the bar clip upon a reinforcement bar and to withdraw the applicator from the bar clip once it is attached, the first clasp assembly holding a first reinforcement bar.

Advantageously, the bar clip applicator system is formed of selectable and replaceable components that provide the user the ability to rapidly determine, select and install: a bar clip of the required gauge, a receiver tip of the corresponding gauge and a applicator handle the desired length so as to allow the user to remotely apply a bar clip to a reinforcement bar.

Accordingly it is an object of the present invention to provide a bar clip applicator having a detachable receiver tip that is selected from a plurality of numerically coded receiver tips, each having a gauge corresponding to the selected reinforcement bar clip.

It is an additional object of the present invention to provide a bar clip applicator having a detachable applicator handle that is selected from a plurality of applicator handles having various lengths.

It is an additional object of the present invention to provide a reinforcement bar clip that is removably attachable to a receiver tip of a bar clip applicator and that can be used to attach adjacent reinforcing bars arranged in a framework.

Finally, it is an object of the present invention to provide a means of guiding a reinforcement bar into a clasp during installation of the clip.

DETAILED DESCRIPTION OF THE INVENTION

Figure 1:
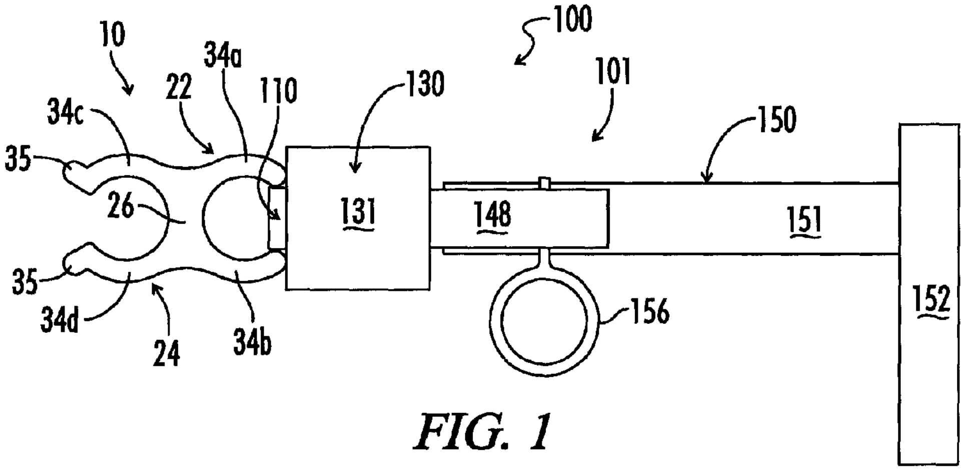
FIG. 1 is side view of the reinforcement bar clip applicator system of the present invention including a bar clip rigidly affixed to a bar clip applicator.
Figure 3:
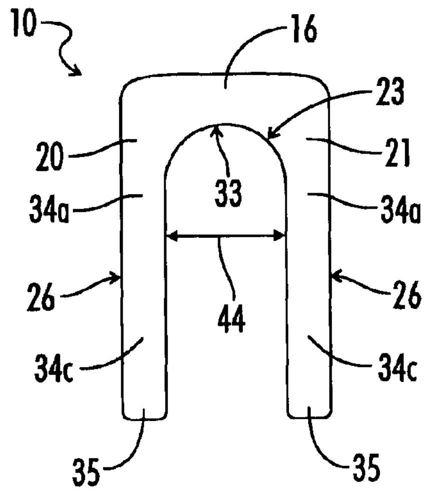
FIG. 3 is a side view of the bar clip of FIG. 1.

One preferred embodiment of the bar clip applicator system 100 of the present invention is shown in FIG. 1. The bar clip applicator system 100 includes a novel reinforcement bar clip 10 friction fitted upon the receiver tip 110 of a bar clip applicator 101. The novel reinforcement bar clip 10 includes a plurality of clasp assemblies. The embodiment shown in FIGS. 1, 3 and 4 comprises a pair of opposing first and second clasp assemblies 20, 21. Each first and second clasp assembly 20, 21 is attached to parallel first and second longitudinal supports 16, 18 and extends downward from the longitudinal supports 16, 18. The opposing first and second clasp assemblies 20, 21, together with the first and second longitudinal supports 16, 18, form a U-shaped profile, as is shown in FIG. 3.

Figure 2:
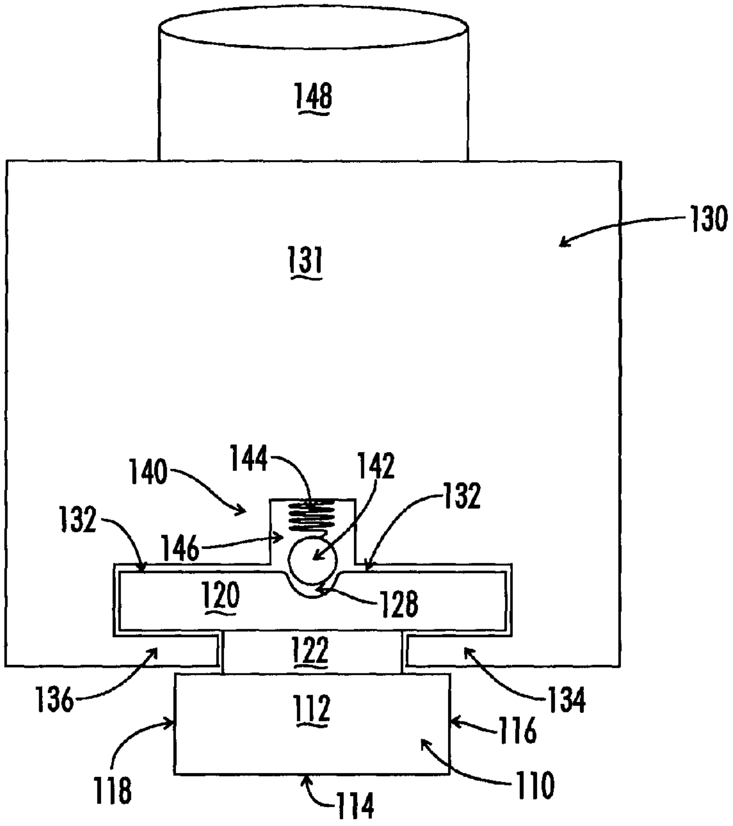
FIG. 2 is a cross-sectional view of the applicator body of the present invention.
Figure 4:
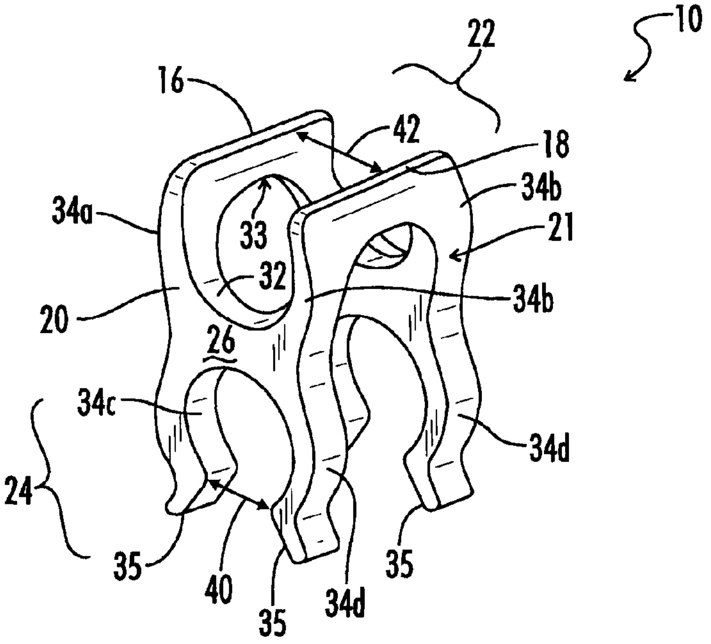
FIG. 4 is oblique view of the bar clip of FIG. 1.

Referring again to FIGS. 1, 3 and 4, the first and second clasp assemblies 20, 21 each comprise an upper clasp 22 for holding a first reinforcement bar and a lower clasp 24 for holding a second reinforcement bars in a parallel orientation to the first reinforcement bar. For each first and second clasp assembly 20, 21, opposing, convexly curved fingers 34 extend upward from either end of a transverse support 26 so as to form the upper clasp 22. One finger 34*a* is shown attached to the first longitudinal support 16 and the opposing finger 34*b* is shown attached to the second longitudinal support 18. Together with the transverse support 26, the opposing fingers 34*a*, 34*b* form an upper seat 32. Referring now to FIGS. 1, 2 and 4, an upper clasp gap 42 is disposed between the first and second longitudinal supports 16, 18 so as to provide a means of inserting the first reinforcement bar into the upper clasp 22. The upper clasp gap 42 is selected so as to be narrower than the diameter of the first reinforcement bar, while the upper seat 32 is adapted in size and shape to compressively engage the first reinforcement bar when such bar is placed within the upper clasp 22.

Referring again to FIGS. 1, 3 and 4, for each first and second clasp assembly 20, 21, opposing, convexly curved fingers 34*c*, 34*d* extend downward from either end of the transverse support 26 so as to form the lower clasp 24. Together with the transverse support 26, the pair of opposing fingers 34*c*, 34*d* form a lower seat 30. Referring now to FIGS. 1, 2 and 4, a lower clasp gap 40 is disposed between the opposing fingers 34*c*, 34*d* so as to provide a means of inserting a reinforcement bar into the lower clasp 24. The lower clasp gap 40 is selected so as to be narrower than the diameter of the second reinforcement bar, while the lower seat 30 is adapted in size and shape to compressively engage the second reinforcement bar when such bar is placed within the lower clasp 24.

The reinforcement bar clip 10 of the bar clip applicator system 100 of the present invention is shown in FIG. 1 installed upon the bar clip applicator 101. In this configuration, the bar clip applicator system 100 is ready for installation of the reinforcement bar clip 10 upon a reinforcement bar.

In a particularly preferred embodiment, the reinforcement bar clip 10 is made of a resilient molded plastic having a color selected to indicate the appropriate gauge of the bar clip, the term 'gauge' is used herein to indicate the size of bar that the bar clip can attach and hold. For example, a bar clip 10 having a red color may have a gauge of 0.425 inches and a bar clip 10 having a white color may have a gauge of 0.525 inches. Other color coding schemes would be obvious to one skilled in the skilled in the art. Optionally, the gauge of the clip is cast, printed or otherwise numerically indicated on the surface of the clip 10. Preferably, the gauge of the clip is indicated by both color of the bar clip 10 and by a numerical indication embossed on the surface of the bar clip 10. Advantageously, color coding of reinforcement bar clips provides a simple method of allowing the user to rapidly identify and select the appropriate reinforcement bar clip 10 from a mixed selection of clips. Also, where the reinforcement bars of a single gauge are used to form a framework, use of color-coded reinforcement bar clips allows for easy identification of errors caused by inadvertent use of the wrong size of reinforcement bar clips in forming the framework.

The bar clip applicator 101 of the present invention also includes a receiver tip 110, an applicator block 130 and an applicator handle 150 attached by a connecting rod 148 to the block 130. Referring now to FIG. 2, the applicator block 130 of the preferred embodiment of the applicator includes a block body 131 having a receiver channel 132 machined into one surface. The machined channel 132 it adapted to receive and retain a selected receiver tip 110 by means of a first and second overhanging lip 134 and 136. A detent assembly 140 engages the receiver tip 110 so as to retain the receiver tip 110 within the receiver channel 132. The detent assembly shown in FIG. 2 further includes a detent body 142 and detent spring 144 housed within a detent cavity 146.

Figure 5:
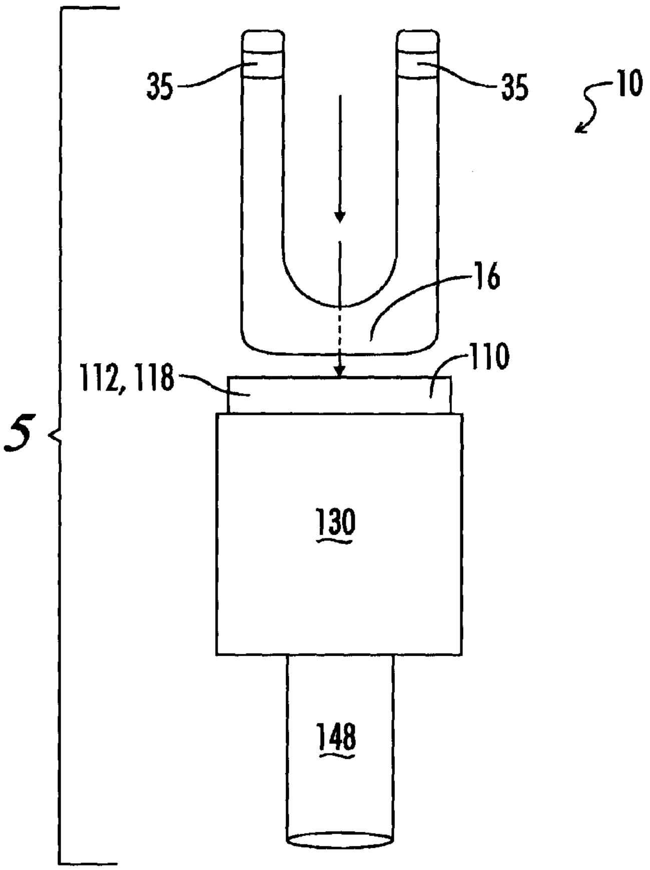
FIG. 5 side view of the bar clip of FIG. 1 positioned for installation upon the receiver tip of the bar clip applicator of FIG. 1.
Figure 6:
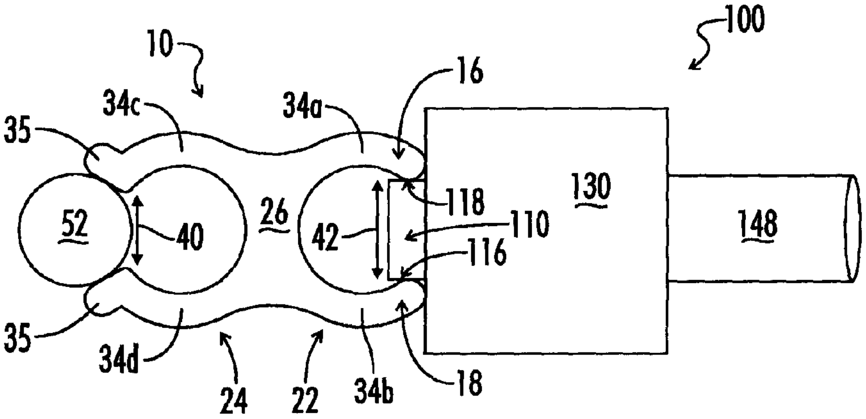
FIG. 6 is side view of the bar clip applicator system of FIG. 1 positioned for installation of the first claps of the bar clip upon a reinforcement bar.
Figure 7:
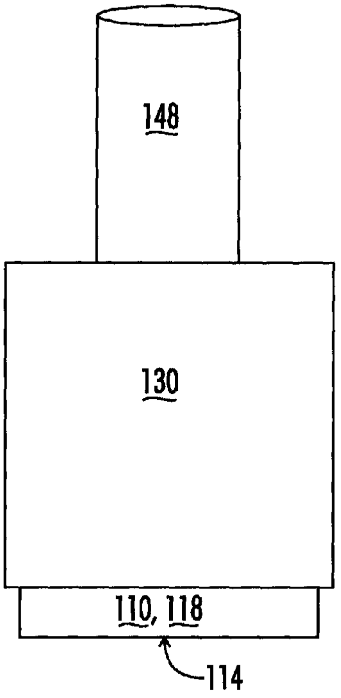
FIGS. 7 and 8 are detail side and transverse views of the applicator body shown in FIG. 2.
Figure 8:
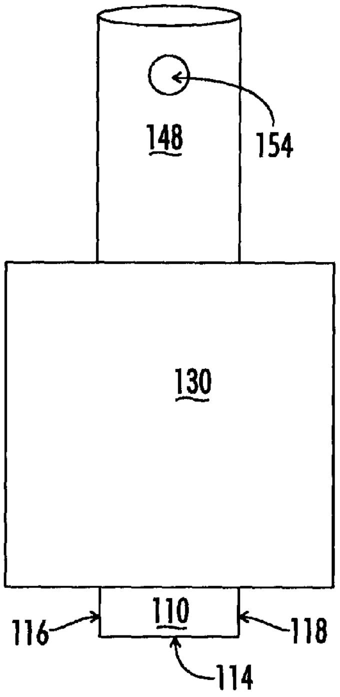
Figure 10:
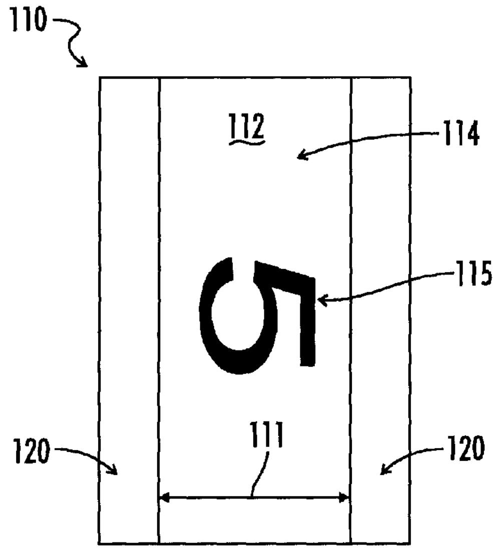
FIGS. 10-12 are overhead, side and transverse views of the receiver tip of the bar clip applicator of FIG. 1.
Figure 11:
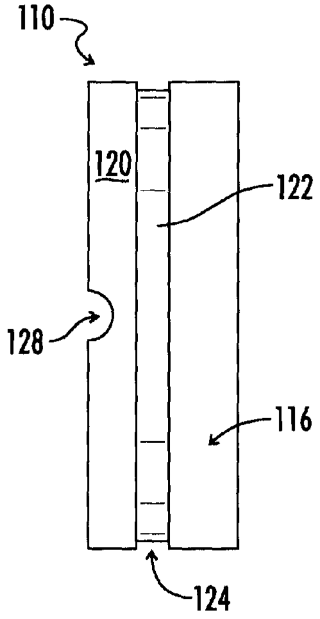
Figure 12:
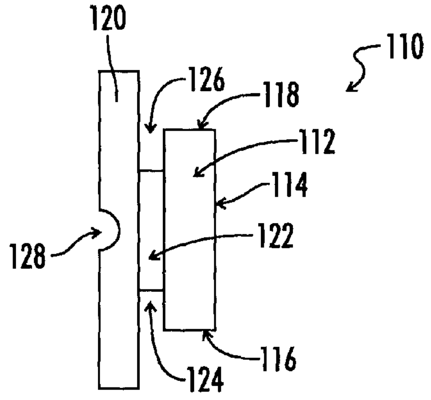

Referring to FIGS. 2, 10, 11, and 12, a selectable and replaceable receiver tip 110 of the present invention is shown. The receiver tip 110 includes a tip block 112 for receiving the upper clasp 22 of the novel reinforcement bar clip 10. Referring to FIGS. 10-12, the receiver tip 110 has a tip width 111 sized to receive a correspondingly selected reinforcement bar clip 10, as shown in FIGS. 5 and 6. The receiver tip 110 of the preferred embodiment further includes a tip retaining plate 120 and a connecting body 122 joining the tip retaining plate 120 and the tip block 112, as shown in FIGS. 11 and 12. The connecting body 122 joins the retaining plate 120 and tip block 112 so as to form first and second side channels 124 and 126. A detent receiving cavity is disposed on a face of the tip retaining plate 120 opposite the tip block 112.

Referring now to FIGS. 10-12, the receiver tip 110 of the preferred embodiment of the applicator 101 is designed to be removable and selectable, with the selected receiver tip 110 having a tip width 111 corresponding to the gauge of reinforcement bar clip 10 required for the joining of the reinforcement bars. The selected receiver tip 110 has a tip face 114 and tip engagement surfaces 116 and 118 which are separated by tip width 111. As stated above, the tip width 111 is determined by the gauge size of the bar clip 10 to be installed and is selected such that the upper clasp 22 fingers 34*a* and 34*b* slide over the tip block 112 and engage the first and second engagement surfaces 116 and 118. As shown in FIG. 10, a tip label surface 115 is disposed upon tip face 114 so as to indicate to a user the gauge or tip width 111 of the particular embodiment of the receiver tip 110. For example, a selected receiver tip 110 may have a tip label surface 115 that indicates the gauge numeral "5" and, as such, corresponds to a selected bar clip 10 having a red color and a gauge of 0.425 inches. Other color-numerical gauge coding schemes would be obvious to one skilled in the skilled in the art. Optionally, the gauge of the receiver tip 110 is cast, printed or otherwise numerically indicated on a surface of the tip receiver 10. Advantageously, numerically coding the receiver tips 110 provides a simple method of allowing the user to rapidly identify and select the appropriate receiver tip 110 from a mixed selection of receiver tips 110 based on the gauge of the color-coded reinforcement bar clip 10 selected.

Figure 9:
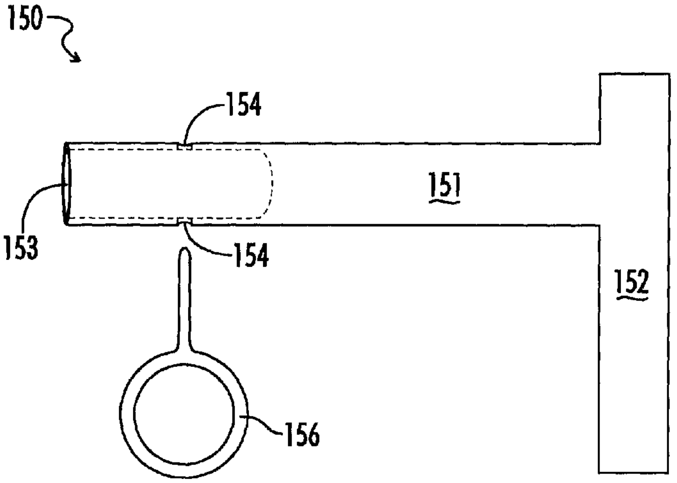
FIG. 9 is a side view of the applicator handle of the bar clip applicator of FIG. 1.

Another aspect of this novel applicator system 100 is the applicator handle 150. In the preferred embodiment shown in FIG. 1, the applicator handle 150 is detachable from the applicator block 130 and is held in place by a keeper pin 156. Referring now to FIG. 9, the applicator handle 150 of the preferred embodiment of the present invention includes a shaft 151 attached to a handle 152. The shaft 151 has a shaft receiving cavity 153 which is fitted over the connecting rod 148 of the applicator block body 131.

A preferred method of installing the bar clip 10 upon one or more reinforcement bars is shown in FIGS. 1, 5 and 6. The gauge of the first reinforcement bar is determined and the appropriate gauge of bar clip 10 is selected. The receiver tip 110, in the preferred embodiment of the application tool 100, is interchangeable and is selected by the numerically indicated gauge appropriate for installation into the first clasp 22 of the selected bar clip 10. As shown in FIGS. 5 and 6, the bar clip 10 is removably installed upon the bar clip applicator 101 by sliding the receiver tip 110 into the upper clasp gap 42 so as to form a rigid assembly held together by a friction fit between the receiver tip 110 and the first and second longitudinal supports 16, 18.

One novel aspect of the present invention is the flared guide 35 attached to the lower ends of each opposing finger 34*c*, 34*d* of the lower clasp 24. During installation of the lower clasp 24 of the clip 10 upon a reinforcement bar 52, each pair of flared guides 35 engage the bar 52 and guide it to the lower clasp gap 40 for insertion into the lower clasp 24 of each clasp assembly 20, 21. As the lower clasp 24 is pressed against the reinforcement bar 52, the flaring of guides 35 cause the opposing fingers 34*c*, 34*d* to spread open so as to enlarge the lower clasp gap 40 sufficiently for the insertion of the bar 52. After the bar 52 is inserted into the lower clasp 24, the opposing fingers 34*c*, 34*d* close so as to hold the bar in the lower seat 30. Once the reinforcing bar 52, is inserted into the lower clasp 24, the receiver tip 110 of the application tool 100 is removed from the upper clasp gap 42.

With the upper clasp gap 42 clear, a second reinforcement bar, is positioned above the upper clasp gap 42. In one embodiment of the present invention, the user must manually grasp the second reinforcement bar and position it above the upper clasp gap 42. In alternate embodiments of the present invention, the bar clip applicator 101 further included a means of capturing a second reinforcement bar. This invention contemplates various means of capturing the second reinforcement bar, including a crook or hook attached to the bar clip applicator 101 and adapted to receive a reinforcement bar. Alternately, a crook cavity may be disposed in the tip face 114 of the receiver tip 110. In the method of this invention using such a capture means allows the user to remotely position the second reinforcement bar above the second clasp gap. The second reinforcement bar and the clip 10 are forced together so as to cause the opposing fingers 34*a*, 34*b* to spread open so as to enlarge the upper clasp gap 42 sufficiently for the insertion of the bar. After the bar is inserted into the upper clasp 22, the opposing fingers 34*a*, 34*b* close so as to hold the bar in the upper seat 32.

Thus, although there have been described particular embodiments of the present invention of a new and useful Bar Clip Applicator, it is not intended that such references be construed as limitations upon the scope of this invention except as set forth in the following claims.

What is claimed is:

1. A reinforcement bar clip applicator system comprising:
- a reinforcement bar clip having opposing first and second clasps each comprising a plurality of pairs of opposing flexible fingers, the first and second clasps including, respectively, a first and second clasp gap disposed between the opposing fingers of the plurality of pairs of opposing flexible fingers of the first and second clasps;
- an elongated applicator body having first and second ends;
- a handle attached to and extending from the first end of applicator body; and
- a receiver tip attached to and extending from the second end of the applicator body in a direction opposite from the handle, the receiver tip inserted into the second clasp gap of the bar clip so as to form an assembly held together by a friction fit between the receiver tip and at least two opposing flexible fingers of the second clasp, wherein the first clasp gap is open when the receiver tip is in place in the second clasp gap so that the first clasp gap can receive a reinforcement bar.

2. The system of claim 1, wherein the handle is removably attached to the applicator body.

3. The system of claim 1, wherein the receiver tip is removably attached to the applicator body.

4. The system of claim 3, wherein the applicator body further includes:
- a receiver channel disposed within the applicator body, the receiver tip being received within the receiver channel; and
- a retainer engaging the receiver tip to hold the receiver tip in place within the receiver channel.

5. The system of claim 1, wherein the receiver tip includes a tip face and first and second tip engagement surfaces, the tip engagement surfaces separated by a tip width greater than the second clasp gap such that the opposing fingers of the plurality of pairs of opposing flexible fingers of the second clasp engage the first and second engagement surfaces when the receiver tip is received within the second clasp gap.

6. The system of claim 1, wherein the clip is free from any engagement with the applicator body, the handle or the receiver tip, other than the friction fit engagement of the receiver tip within the second clasp of the clip.

* * * * *

UNITED STATES PATENT AND TRADEMARK OFFICE
CERTIFICATE OF CORRECTION

PATENT NO. : 7,908,723 B1
APPLICATION NO. : 11/142539
DATED : March 22, 2011
INVENTOR(S) : Jon R. Kodi It is certified that error appears in the above-identified patent and that said Letters Patent is hereby corrected as shown below:

Column 1, line 26, replace “Padrum” with --Padrun--.
Column 1, line 38, replace “Padrum” with --Padrun--.
Column 2, line 30, insert --a-- between “having” and “detachable”.
Column 2, line 30, delete “a” after --detachable--.
Column 2, line 57, replace “a” with --an--.
Column 3, line 12 insert --a-- before “side”.
Column 3, line 18, insert --an-- before “oblique”.
Column 3, line 19, insert --is a-- before “side”.
Column 3, line 22, insert --a-- before “side”.
Column 3, line 23, replace “claps” with --clasp--.
Column 3, line 52, replace “bars” with --bar--.
Column 4, line 28, delete “skilled in the” before --art--.
Column 4, line 46, replace “it” with --is--.
Column 5, line 18, delete “skilled in the” before --art--.
Column 6, line 3, replace “included” with --includes--.

Signed and Sealed this
Third Day of May, 2011

David J. Kappos
*Director of the United States Patent and Trademark Office*